US008706097B2

(12) United States Patent
Garg et al.

(10) Patent No.: US 8,706,097 B2
(45) Date of Patent: Apr. 22, 2014

(54) DELAYING DELIVERY OF TELECONFERENCE ACCESS INFORMATION

(75) Inventors: Neeraj Garg, Milton (CA); Adrian Michael Logan, Milton (CA)

(73) Assignee: BlackBerry Limited, Waterloo, Ontario (CA)

( * ) Notice: Subject to any disclaimer, the term of this patent is extended or adjusted under 35 U.S.C. 154(b) by 444 days.

(21) Appl. No.: 12/855,874

(22) Filed: Aug. 13, 2010

(65) Prior Publication Data

US 2012/0040646 A1    Feb. 16, 2012

(51) Int. Cl.
*H04M 3/42* (2006.01)
*H04W 12/00* (2009.01)
*H04W 12/06* (2009.01)
*H04W 12/08* (2009.01)

(52) U.S. Cl.
CPC ............. *H04W 12/00* (2013.01); *H04W 12/06* (2013.01); *H04W 12/08* (2013.01)
USPC .................. 455/416; 455/414.1; 455/417

(58) Field of Classification Search
CPC ...... H04W 12/00; H04W 12/06; H04W 12/08
USPC ........ 455/414.1, 416, 417, 445, 554.1, 554.2, 455/555, 412.2, 41; 379/202.01, 205.05, 379/202.1, 221.09, 230, 84, 88.19
See application file for complete search history.

(56) References Cited

U.S. PATENT DOCUMENTS

| | | | | |
|---|---|---|---|---|
| 5,408,518 | A * | 4/1995 | Yunoki | 379/202.01 |
| 5,973,724 | A * | 10/1999 | Riddle | 348/14.07 |
| 7,277,697 | B2 * | 10/2007 | Desai et al. | 455/416 |
| 7,308,090 | B2 * | 12/2007 | White et al. | 379/202.01 |
| 2003/0158900 | A1 * | 8/2003 | Santos | 709/205 |
| 2007/0133774 | A1 * | 6/2007 | Fujimoto | 379/202.01 |
| 2007/0274492 | A1 | 11/2007 | Baker et al. | |

(Continued)

FOREIGN PATENT DOCUMENTS

| | | |
|---|---|---|
| EP | 1098504 | 5/2001 |
| EP | 1294165 | 3/2003 |

OTHER PUBLICATIONS

Canadian Intellectual Property Office, Office Action for Canadian Application No. 2,748,623, dated Nov. 14, 2012, 3 pages.

(Continued)

*Primary Examiner* — Jean Gelin
(74) *Attorney, Agent, or Firm* — Finnegan, Henderson, Farabow, Garrett & Dunner, LLP

(57) ABSTRACT

A system and method for delaying delivery of teleconference access information includes at least one processor, at least one computer readable medium in communication with the processor, and at least one program module stored on the medium. The module is operative to create a teleconference notification in response to a request from a requestor device. The module can also assign a date, time, and access information for the teleconference, receive an input from the requestor device to delay delivery of the access information, and deliver the teleconference notification to at least one participant device. The teleconference notification has at least the date and time of the teleconference but not the access information. The module delays delivery of the access information to the at least one participant. For example, delivery of the access information is delayed until a predetermined time period from the assigned date and time of the teleconference.

20 Claims, 9 Drawing Sheets

(56) References Cited

U.S. PATENT DOCUMENTS

| | | | |
|---|---|---|---|
| 2008/0069328 A1* | 3/2008 | Bostick et al. | 379/202.01 |
| 2008/0167056 A1* | 7/2008 | Gilzean et al. | 455/466 |
| 2009/0323916 A1* | 12/2009 | O'Sullivan et al. | 379/202.01 |
| 2010/0189242 A1* | 7/2010 | Jenkins et al. | 379/202.01 |
| 2011/0235787 A1* | 9/2011 | Ramanathaiah | 379/88.22 |
| 2011/0252366 A1* | 10/2011 | Balasubramanian et al. | 715/809 |

OTHER PUBLICATIONS

European Patent Office, Communication enclosing extended European Search Report for European Application No. 10172761.8, dated Jan. 31, 2011, 6 pages.

European Patent Office, Communication pursuant to Article 94(3) for European Application No. 10172761.8, dated May 9, 2012, 2 pages.

* cited by examiner

DELAYING DELIVERY OF TELECONFERENCE ACCESS INFORMATION

FIELD OF TECHNOLOGY

The present disclosure relates generally to methods of transmitting teleconference access information to teleconference participants. More specifically, the present disclosure relates to a system and method for delaying delivery of teleconference access information for security.

BACKGROUND

Presently, teleconference calls are organized using meeting request sent via electronic mail (email). For example, when a teleconference call is scheduled, all meeting participants receive a notification, such as an email or an appointment for an electronic calendar that includes the date and time of the teleconference, as well as a call-in phone number and the password or passcode. Automatic reminders are typically sent to meeting participants reminding the participants of the upcoming date and time of the teleconference. The automatic reminders can be sent as an email, an electronic calendar notification, an electronic task notification, a short message string (SMS) text message, or a pop-up window that is displayed on the participant's computing device display screen, mobile phone display screen, a portable electronic device display screen, or any other display screen of an electronic device. When the teleconference reminders are sent to participants can be default-selected, user-defined, or pre-programmed by a computing device. For example, the meeting reminders can be sent weeks, days, hours, or minutes before the teleconference.

BRIEF DESCRIPTION OF THE DRAWINGS

Implementations of the present disclosure will now be described, by way of example only, with reference to the attached Figures, wherein.

DETAILED DESCRIPTION

Figure 1:
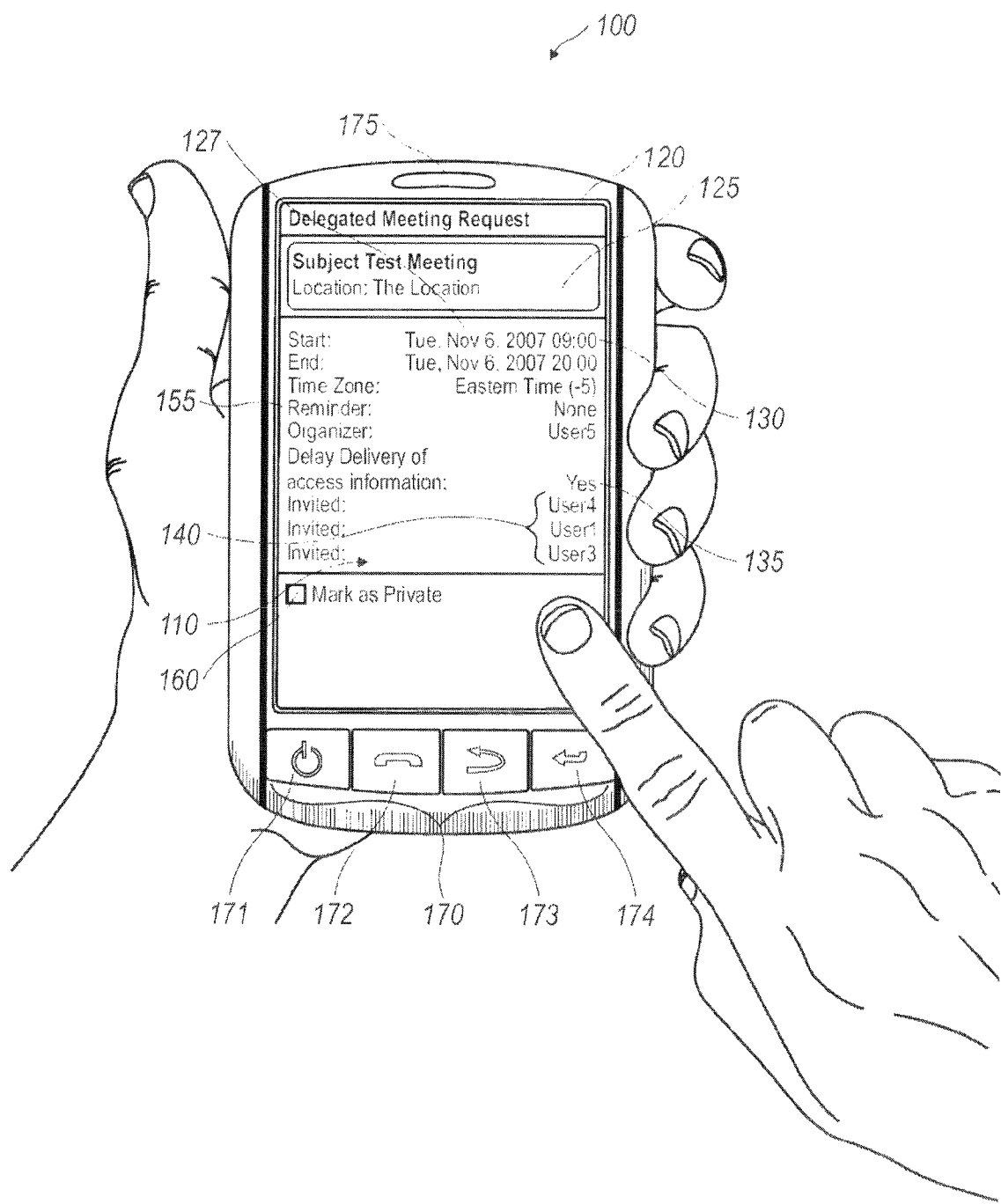
FIG. 1 is a front view of an example of a mobile device with an illustrative display screen of a system for scheduling a teleconference.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Typically, when a meeting request is created and sent, the call-in phone number and the password are immediately sent along with the meeting request. The meeting request is sent well in advance of the date and time of the teleconference. Hence, the call-in phone number and the password may remain in the teleconference participants' email inbox, electronic calendar, computer, or mobile communication device days before the date and time of the teleconference. Thus, other unauthorized individuals may have access to the authorized participant's call-in phone number and password and may join the teleconference even though the unauthorized individual was not invited. For example, the unauthorized individual may gain access to the authorized participant's calendar and obtain all meeting times, call-in numbers, and passwords, and then secretly join the teleconferences in silence and listen to secret and confidential information.

A system for delaying teleconference access information will be described with reference to FIGS. 1-6. Several definitions that apply throughout this document will now be presented. The term "teleconference" refers to telephone conferences, videoconferences, videoteleconferences, shared workspaces, web meetings, or any other meetings that require media and access information. The term "teleconference notification" refers to an email, an electronic notification, an appointment notification, an electronic message, or the like that can be delivered electronically to a recipient that includes information regarding the teleconference meeting. The term "access information" refers to phone numbers, access codes, passwords, passcodes, personal identification numbers (PINs), website hyperlinks, shared space access, website access, and the like. The term "attendees" refers to the invitees, participants, guests, and authorized individuals invited and requested to attend the teleconference. The term "requestor" refers to the organizer, scheduler, host, planner, or individual who schedules the teleconference. The term "requestor device" and "participant device" can include a handheld mobile communication device, a handheld device, a cellular phone, a desktop computer, a laptop computer, a netbook, a personal digital assistant, an electronic handheld calendar device, or the like. A "display" can be a liquid crystal display (LCD), a light-emitting diode (LED) display, a touchscreen display, or the like. The term "assigns" or "assigning" refers to assigning, setting, identifying, selecting, appointing, or scheduling. For example, assigning a date and a time for a teleconference meeting. The term "pull-down box" refers to a pull-down menu, a drop-down menu, a pull-down list, a drop-down list, or any other similar list of user-selectable options or choices that can be revealed when a user selects or clicks on the pull-down box.

In one implementation of the present disclosure, when a teleconference meeting is scheduled, a teleconference notification is sent to the invited participants or attendees. The teleconference notification can be an email, an appointment added to an electronic calendar of the participants or attendees, an electronic meeting request, or the like. When creating the teleconference notification, the teleconference organizer assigns the time and date of the teleconference, the location of the teleconference, the invited participants, the subject of the teleconference, a date or time to send a reminder to the participants regarding the teleconference, teleconference access information, and other similar teleconference information. For example, the teleconference access information can include the telephone number for participants to call on the date of the teleconference and a passcode to join the teleconference. When the teleconference organizer or requestor completes the teleconference information, the teleconference notification can be electronically delivered to the teleconference participants. However, the teleconference notification will include at least the date and the time for the teleconference but will not include the access information.

The access information is sent at a later time, more proximate to the scheduled time of the teleconference meeting. For example, the teleconference scheduling system can deliver the access information to the participants one minute before the scheduled teleconference meeting, forty-five seconds before, five seconds before, ten minutes, thirty minutes before, or any other time period before the scheduled conference that will ensure only authorized participants join the teleconference. The access information can be delivered to the participants in an email, in a short message string (SMS) text message, a pop-up window displayed on the display screen of the participant device, or as a reminder pop-up in an electronic calendar software program.

When the access information is received by the teleconference participant, the participant can access the teleconference using the telephone number or link and join the teleconference by entering the passcode. For example, if the access information included a telephone number and a passcode or PIN number, the participant would dial the telephone number, and when prompted to, enter the passcode or PIN number to join the teleconference. In another implementation, if the access information included a website hypertext link and a password, the participant would enter the website hypertext address or click on the hypertext link to access the teleconference, and then type or enter the password to join the teleconference. By delaying the delivery of the access information, the risk of other individuals obtaining the access to teleconferences is reduced. Additionally, the requestor or organizer of the teleconference does not have to remember to send the teleconference details at the last moment before the teleconference meeting. The requestor or organizer sets or assigns the teleconference information details, but the teleconference scheduling system sends the access information at a scheduled or predetermined time after the teleconference notification has been created and delivered to the participants.

FIG. 1 illustrates an exemplary implementation of a teleconference scheduling system programmed on a teleconference requestor's handheld communication device 100, hereinafter the requestor device. As shown in FIG. 1, the requestor device 100 includes a display 120, a speaker 175 above the display 120, and a plurality of function buttons 170 below the display 120. However, the orientation of the display 120, speaker 175, and the function buttons 170 is simply for example and can vary and need not be oriented as illustrated in FIG. 1. While the function buttons 170 illustrated in FIG. 1 include a power button 171, a call button 172, a back button 173, and an enter button 174, one of ordinary skill in the art will appreciate that the function buttons 170 can have other functions such as a hang-up function, a volume function, or the like.

With respect to the display 120, FIG. 1 illustrates a screen 110 for creating a teleconference notification displayed on the display 120 of a requestor device. In the illustrated example, the requestor device is a handheld communication device 100. The screen 110 is presented on the display 120 upon receipt of a user input from the requestor indicating a request to create a teleconference notification. The screen 110 allows the requestor to input teleconference information and teleconference details which can be sent to the invited participants of the teleconference. When creating the teleconference notification 110, a template for the teleconference notification 110 is presented and includes a Subject field 125 for entering the subject of the teleconference or the topics to be discussed during the teleconference. The teleconference notification 110 also includes a field for assigning the date 127 and the time 130 of the teleconference. In the specific implementation illustrated in FIG. 1, the date 127 and time 130 for both the start time and end time of the teleconference meeting is shown; however, both the start time and end time need not be shown. In an alternative implementation, the requestor can assign the date 127 and the time 130 for the start of the teleconference and can set the duration of the teleconference by selecting a duration from a pull-down box. Such a duration can include thirty minutes, one hour, fifteen minutes, or any other duration. In at least one implementation, only pre-defined time periods can be selected. In another implementation, a user-defined duration can be an option in the pull-down box. In other implementations, the duration can be an editable field allowing the user to define the duration.

In FIG. 1, there is also a field for selecting the option of delaying delivery 135 of access information. In the particular example illustrated in FIG. 1, the selectable option is a drop-down menu with the options of YES and NO. However, in other implementations, the selectable option can be a check box, a radio button, a toggle switch, or any other selectable option that allows the requestor to choose whether or not access information is delivered to invited participants with the teleconference notification 110 or is delivered at a later time. The teleconference notification 110 can also include a Participants field 140 for identifying the participants of the teleconference. Additionally, there can be a field for setting a reminder 155 to be electronically delivered to the invited participants identified in the Participants field 140. There can also be a field 160 for marking the meeting request as private to notify the participants that only the invited participants are to join the teleconference. One of ordinary skill in the art will appreciate that the teleconference notification 110 can include more or fewer fields and options than as shown in FIG. 1, but will appreciate that the teleconference notification 110 includes at least the date 127, the time 130, a selectable option to delay delivery 135 of access information, and a Participants field 140 for identifying the participants of the teleconference.

Figure 2:
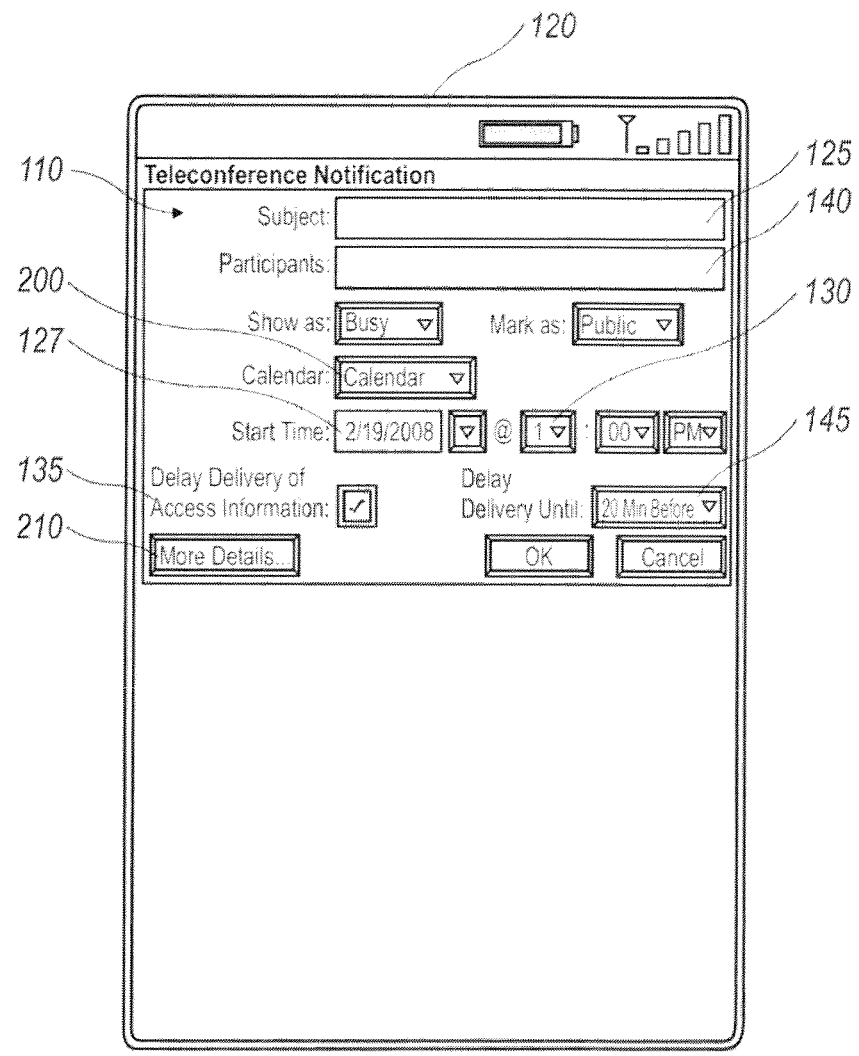
FIG. 2 is an illustrative display screen for creating a teleconference notification.

FIG. 2 is an illustration of an alternative implementation of a creation screen for creating a teleconference notification 110 displayed on a display 120 of a requestor device. Similar to FIG. 1, the teleconference notification 110 includes a Subject field 125, a Participants field 140, a Date field 127, a Time field 130, and an option to delay delivery 135 of access information. However, in comparison to FIG. 1, the teleconference notification 110 illustrated in FIG. 2, provides a field to select the start date 127 and time 130 of the teleconference but not the end date and time. Additionally, the option to delay delivery 135 of access information is a check box. Alternatively, the ability to delay delivery 135 of access information can be a non-selectable and non-overwritable selection whereby when a teleconference notification 110 is created, the teleconference scheduling system automatically delays delivery of access information 150 by a predetermined time period which can either be preset by the teleconference scheduling system or specified by the teleconference requestor device.

The teleconference notification 110 illustrated in FIG. 2 also includes an option to specify the predetermined time period 145 by which to delay delivery of the access information. For example, the option to specify the predetermined time period 145 can be a drop-down menu as illustrated in FIG. 2 that includes the options of delaying delivery of the access information by twenty minutes before the start date and time of the teleconference identified in fields 127 and 130 or any other predetermined time period from the start date and time of the teleconference thereby ensuring that only the authorized participants to the teleconference join the teleconference. Alternatively, the predetermined time period can be default-selected by the teleconference scheduling system. In other implementations, the predetermined time period can be user-defined by the requestor.

Additionally, FIG. 2 also illustrates a calendar option 200 to add the teleconference meeting to the participants' electronic calendars. Additionally, FIG. 2 illustrates a teleconference notification 110 that includes a More Details option 210 for entering additional details and options to the teleconference notification 100. For example, the More Details option 210 can include an option to send reminders to the invited participants regarding the teleconference, a location field for assigning a location for the teleconference, an option to attach documents, images, presentations, and the like that will be discussed in during the teleconference, or any other details that might be needed for scheduling and organizing a teleconference.

Figure 3:
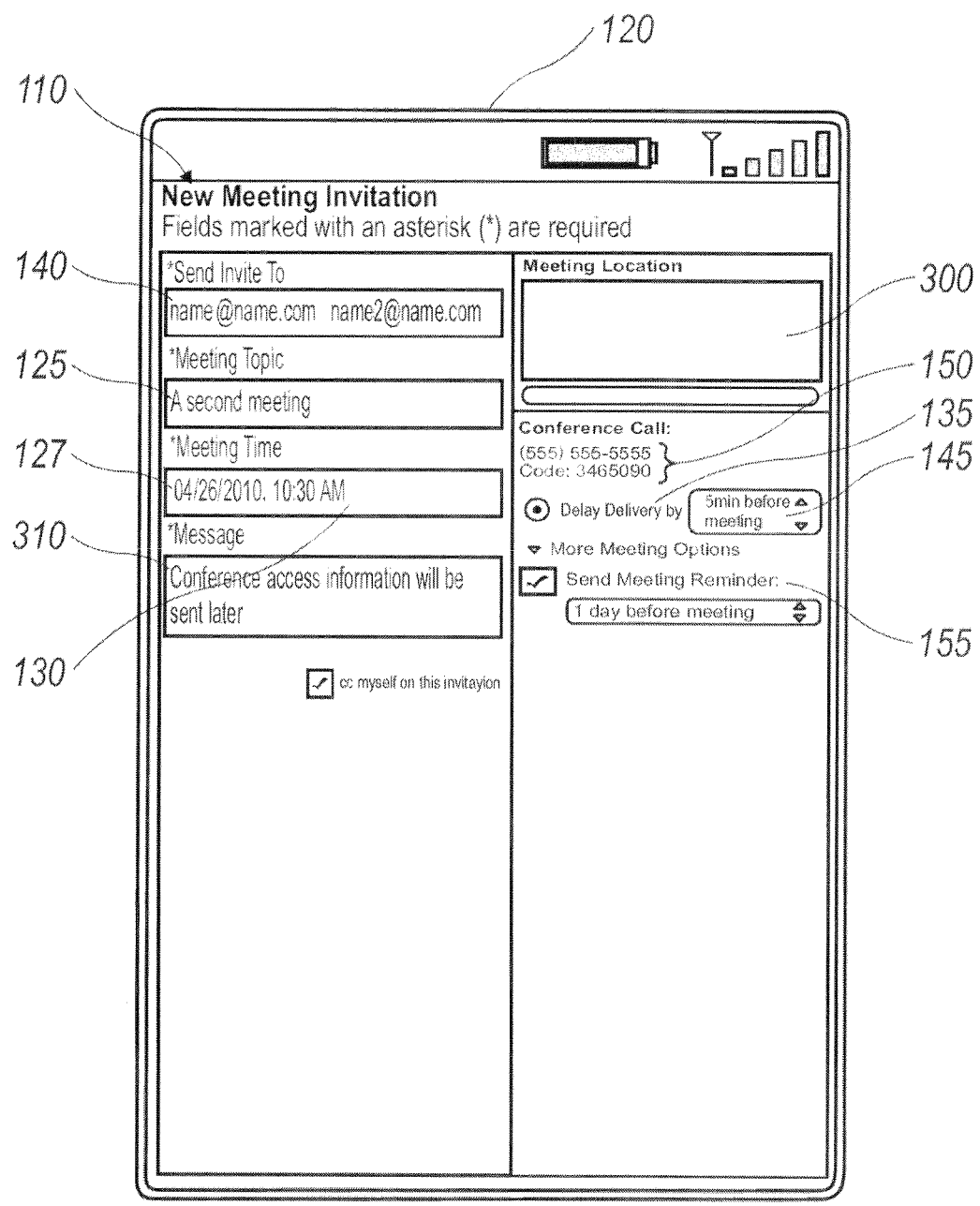
FIG. 3 is an illustrative display screen for creating a teleconference notification in accordance with an alternative implementation.

FIG. 3 is another alternative implementation of a creation screen for creating a teleconference notification 110 displayed on a display 120 of a requestor device. Similar to the teleconference notifications 110 illustrated in FIGS. 1 and 2, the screen for creating a teleconference notification 110 in FIG. 3 includes a Participants field 140, a Subject field 125, a Date 127 and Time 130 field, an option to delay delivery 135 of access information. However, compared to FIGS. 1 and 2, the Date 127 and Time 130 field are combined in a single field labeled as "Meeting Time." Additionally, the option to delay delivery 135 is a radio button that can be selected by the requestor. In addition to the option to delay delivery 135 of the access information, the teleconference notification 110 illustrated in FIG. 3 includes a pull-down for selecting a predetermined time period 145 by which to delay the delivery of the access information. As discussed above, the predetermined time period can five minutes before the 127 and time 130 or any other predetermined time period from the start date and time of the teleconference which can ensure that only the authorized participants can join the teleconference. Alternatively, the predetermined time period can be default-selected by the teleconference scheduling system. In other implementations, the ability to delay delivery 135 of access information can be a non-selectable and non-overwritable selection whereby when a teleconference notification 110 is created, the teleconference scheduling system automatically delays delivery of access information 150 by a predetermined time period which can either be preset by the teleconference scheduling system or specified by the teleconference requestor device.

Another difference between the teleconference notification 110 illustrated in FIGS. 1 and 2 and the teleconference notification 110 illustrated in FIG. 3 is that the teleconference notification 110 in FIG. 3 includes a field for assigning the access information 150 for the teleconference. In the illustrated example, the access information 150 includes a telephone number and a passcode. However, as discussed above, the access information 150 can also be a website and a password. The access information 150 is the information that will be delivered to the participants identified in the Participants field 140 at the later time specified in the predetermined time period menu 145.

The illustrated teleconference notification 110 in FIG. 3 also includes a user-selectable checkbox for sending a meeting reminder 155 to the participants identified in the Participants field 140. In addition to the meeting reminder 155, there can be a pull-down menu for setting the time period 155 when the meeting reminder will be sent. For example, as illustrated, the meeting reminder will be sent one day before the meeting; however, the meeting reminder can be sent one week before, one hour before, twelve hours before, or any other time period 155 before the time and date of the teleconference meeting.

Additionally, the teleconference notification 110 includes a Meeting Location field 300 allowing the teleconference requestor to assign or identify the location of the teleconference. The teleconference notification 110 can also include a Message text box 310 allowing the teleconference requestor to include additional information or details regarding the teleconference. In the illustrated example in FIG. 3, the Message text box 310 allows the requestor to include text notifying the invited participants that the teleconference access information will be sent at a later time.

Figure 4:
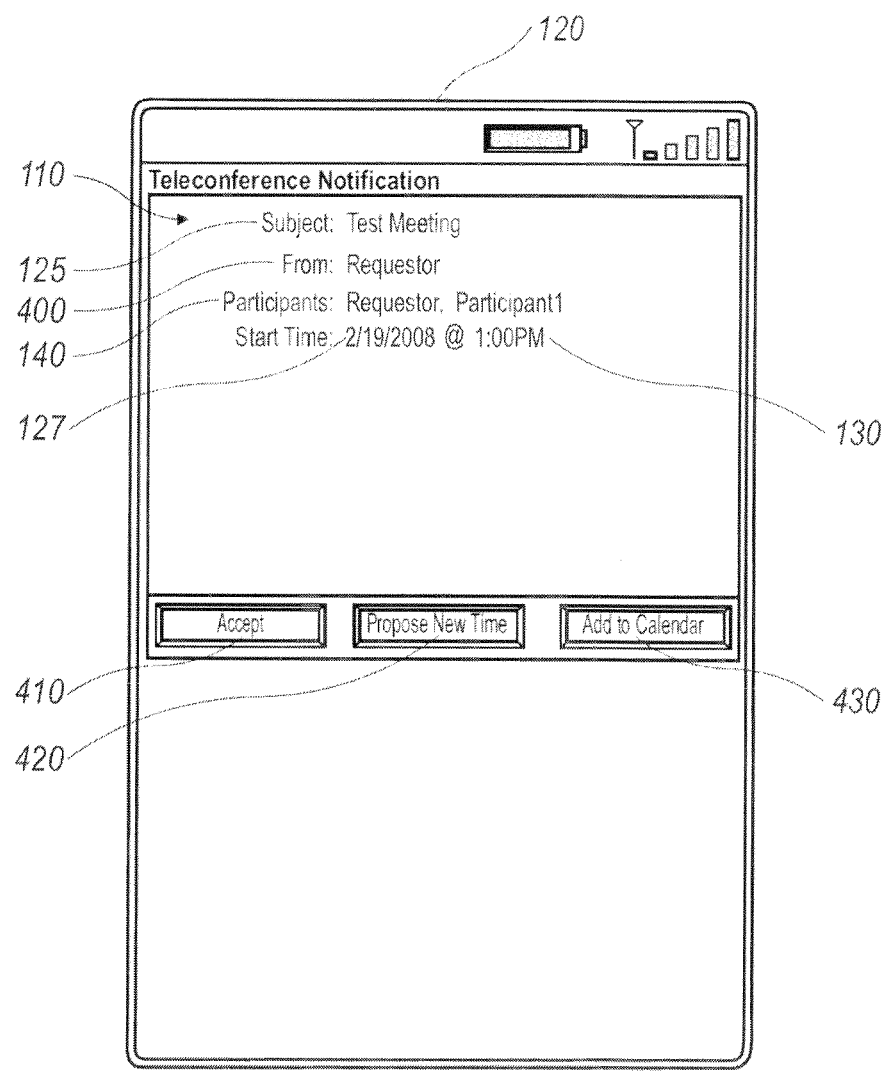
FIG. 4 is an illustrative display screen of a teleconference notification as received by a participant of the teleconference's participant device.

FIG. 4 is an illustration of a teleconference notification 110 that is sent to a participant or attendee identified in the teleconference notification 110 and received on the participant's participant device. FIG. 4 illustrates the teleconference notification 110 displayed on the display 120 of a participant device. The teleconference notification 110 can be sent in an email, as illustrated in FIG. 4 or can be automatically added as an appointment or meeting request on an electronic calendar programmed on the participant device. The illustrated teleconference notification 110 identifies the subject 125 of the meeting, the requestor 400 of the teleconference, the participants 140, the time 130 of the teleconference and the date 127 of the teleconference. The teleconference notification 110 received by the teleconference participant also includes user-selectable buttons or options allowing the participant to reply to the requestor. In the illustrated example of FIG. 4, the user-selectable buttons include an Accept button 410 for accepting or confirming that the participant will attend the teleconference, a Propose New Time button 420 allowing the participant to propose a new teleconference time to the requestor and other participants, and an Add to Calendar button 430 to add the teleconference to the participant's electronic calendar. While the illustrated example shows three specific user-selectable buttons, one of ordinary skill in the art will appreciate that the user-selectable buttons can include other buttons or options such as a Decline to Attend button to indicate the participant will not attend the teleconference, or a Suggest a New Participant to suggest that the requestor add another participant to the teleconference, or any other suitable button. Additionally, as illustrated in FIG. 4, the access information is not included in the teleconference notification 110. Delivery of the access information is delayed as selected by the teleconference requestor when creating the teleconference notification 110, as illustrated in the implementations shown in FIGS. 1-3.

Figure 5:
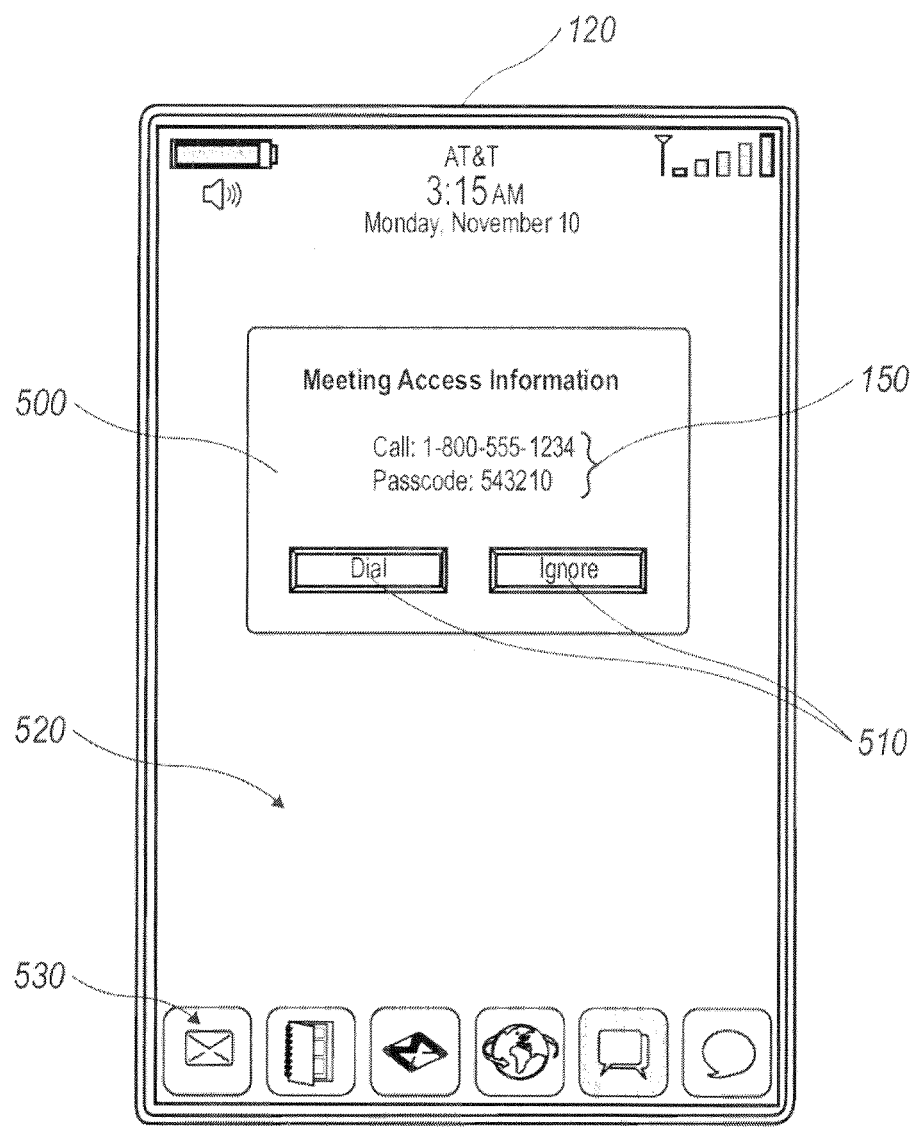
FIG. 5 is an illustrative display screen of a pop-up window displaying the access information for a teleconference on the display of a participant device.

FIG. 5 is an illustration of the delivery of the access information 150 for a teleconference. In FIG. 5, the access information 150 is delivered to the participant device via a pop-up window 500 displayed on the display 120 of the participant device. As illustrated in FIG. 5, the pop-up window 500 is superimposed over the homescreen 520 which includes a menu bar 530 of user-selectable icons. While the illustrated implementation shows the pop-up window 500 superimposed over the homescreen 520, one of ordinary skill in the art will appreciate that the pop-up screen 500 can be superimposed over the currently displayed screen on the display 120. For example, the pop-up screen 500 can be superimposed over an email inbox, a calendar, a currently displayed webpage, or any other currently displayed screen.

In FIG. 5, the pop-up window 500 is presented to the participant as a pop-up notification labeled Meeting Access Information. In the pop-up window 520, the access information 150 includes the teleconference telephone number and the passcode to join the teleconference. As discussed above, the access information 150 can alternatively or additionally include a website hyperlink and a password to join the teleconference. Also as illustrated in FIG. 5, the pop-up window 520 includes user-selectable buttons 510 for dialing the phone number to join the teleconference or to ignore the pop-up window 520 and not join the teleconference. Alternatively, if the access information 150 included a website hyperlink and a password, the participant could select or click on the website hyperlink and enter or type in the password to join the teleconference.

While FIG. 5 illustrates that the access information 150 is sent to the participant in a pop-up window 500, the access information 150 can alternatively be sent in a short message string (SMS) text message, an email, or in a meeting reminder pop-up window. Regardless of the manner in which the access-information 150 is delivered, the access information 150 is delivered after the teleconference notification 110 has delivered. More specifically, the access information 150 is delivered at a predetermined time period, selected by the teleconference requestor or default-selected by the teleconference scheduling system, from the date and the time of the teleconference, thereby ensuring that only the invited participants to the teleconference join the teleconference.

Figure 6:
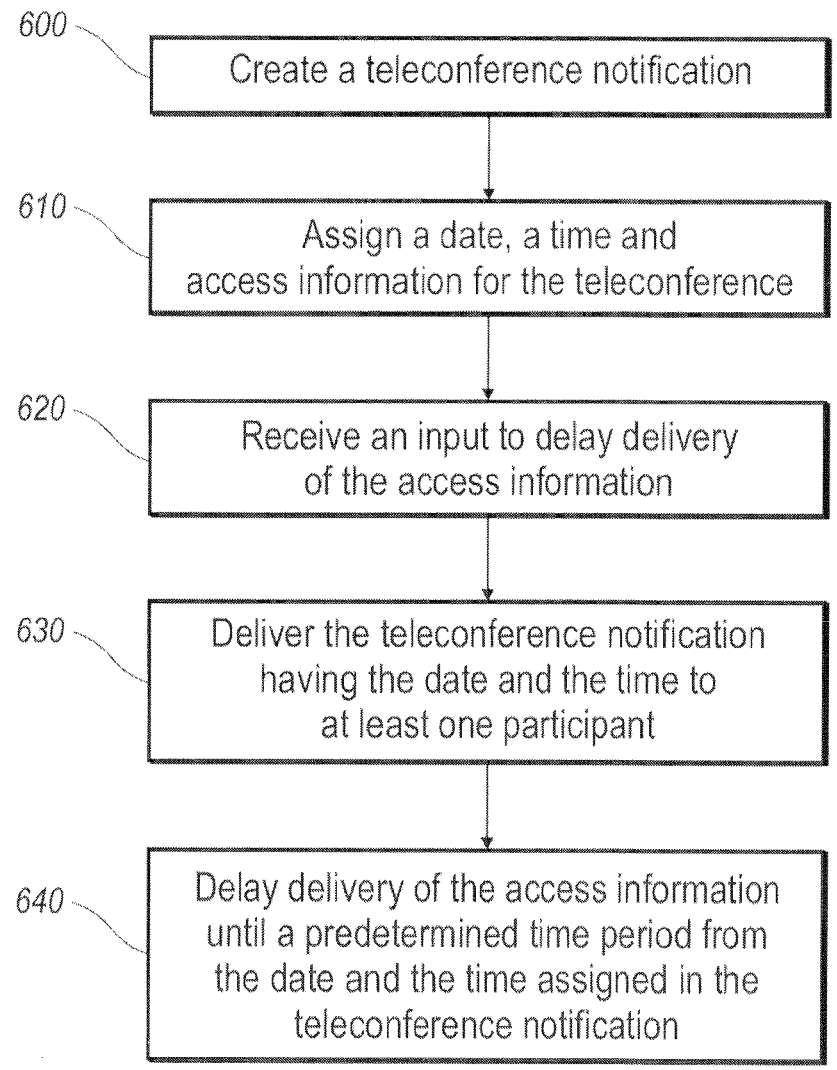
FIG. 6 is a flow chart of a method of delaying delivery of teleconference access information.

FIG. 6 is a flow chart of the teleconference scheduling system for delivering teleconference information as described in the preceding paragraphs. When the requestor requests to set up a teleconference, the requestor sends a signal or input from the requestor device to the teleconference scheduling system to create a teleconference notification. At block 600, the teleconference scheduling system creates a teleconference notification in response to the request from the requestor device. For example, the teleconference scheduling system can display a creation screen on the display of the requestor device, as described with respect to FIGS. 1-3, thereby allowing the requestor to input details and information regarding the teleconference. At block 610, the teleconference scheduling system assigns a date, a time, and access information for the teleconference notification based on the request and inputs from the requestor device. As described in the preceding paragraphs, the access information can be a telephone number, a website link, a shared space and a passcode, password, personal identification number (PIN), or the like.

When inputting teleconference details and information for the teleconference notification, the requestor device can receive an input from the requestor and send a signal to the teleconference scheduling system indicating a desire to delay delivery of access information. At block 620, the teleconference scheduling system receives the input from the requestor device to delay delivery of the access information. At block 630, after the requestor completes the details and information regarding the teleconference, the teleconference scheduling system delivers the teleconference notification having at least the date and the time of the teleconference but not the access information to at least one participant identified by the requestor device during the creation of the teleconference notification. The access information is then delivered at a later time after the teleconference notification has been delivered. For example, in block 640, the teleconference scheduling system delivers the access information to at least one participant device at a predetermined time period from the date and the time that was assigned in the teleconference notification at block 610. As discussed in the illustrated implementations above, the access information can be delivered to the at least one participant device in an email, an SMS text message, a pop-up window, a meeting notification, or any other similar notification. As the access information is delivered at a predetermined time period, such as a short time period, from the date and time of the teleconference, the risk that unauthorized participants can join the teleconference is reduced. Additionally, the risk that unauthorized participants can silently join the teleconference and obtain secret or confidential information is reduced by the method of delaying delivery of teleconference access information as described herein.

In at least one alternative implementation, the teleconference scheduling system can store the access information 150 once the teleconference notification 110 has been created. For example, the teleconference scheduling system can store the access information 150 on a server, on the requestor device, or on at least one of the participant devices. The teleconference scheduling system can store the access information 150 until the predetermined time period from the date 127 and the time 130 assigned in the teleconference notification 110 when the access information 150 will be sent to the participant device(s) of the at least one participant 140 of the teleconference. Hence, the access information 150 is held secure, and the authorized participants to the teleconference will receive the access information 150 at a time proximate to the assigned time 130 of the teleconference to reduce the risk of unauthorized individuals joining the teleconference in silence and obtaining confidential and secret information. For example, if the access information 150 is stored on requestor device, the requestor device can be programmed to automatically deliver the access information 150 to all or fewer than all participant devices at a predetermined time period from the date 127 and time 130 of the teleconference, without further user intervention. Alternatively, if the access information 150 is stored on a server, the server handles the access information 150 and delivers the access information 150 at a predetermined time period from the date 127 and time 130 of the teleconference. One of ordinary skill in the art will appreciate that other teleconference information 150 and details other than the access information 150 can be stored on the requestor device, the participant device, or a server and can be delivered at a predetermined time period from the date 127 and time 130 of the teleconference.

Even more, it will be appreciated that in any implementation of the system and method of delaying delivery of teleconference access information, if the date 127 and the time 130 of the teleconference is changed or modified after the teleconference has been delivered, the date and time when the access information 150 is to be delivered can be automatically adjusted so that the access information 150 can still be delivered at the same predetermined time period from the start of teleconference. In other words, the system can automatically update the date and time of delayed-delivery of the access information 150 by measuring the predetermined time period from the new or modified teleconference date 127 and time 130. For example, if a participant proposes a new date and time for the teleconference, and the requestor accepts the proposed date and time, the requestor can update the teleconference notification 110 to deliver the new date 127 and time 130 of the teleconference but does not need to update the date and time of the delayed-delivery of the access information 150. In at least one implementation, the teleconference scheduling system can automatically adjust or update the date and time of the delayed-delivery of the access information 150 by applying the predetermined time period to the updated date 127 and time 130 of the teleconference.

The present disclosure can take the forms of hardware, software or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present disclosure can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the present disclosure and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The present application relates to the control and management of communications. Although reference may be made to "messages" or "notifications" in the description of example implementations below, it will be appreciated that the described systems and methods are applicable to session-based communications in general and not limited to electronic messages or message-based communications. It will also be appreciated that the systems and methods may not be limited to sessions and may be applicable to voice-mail communications or notifications in some implementations.

Figure 7:
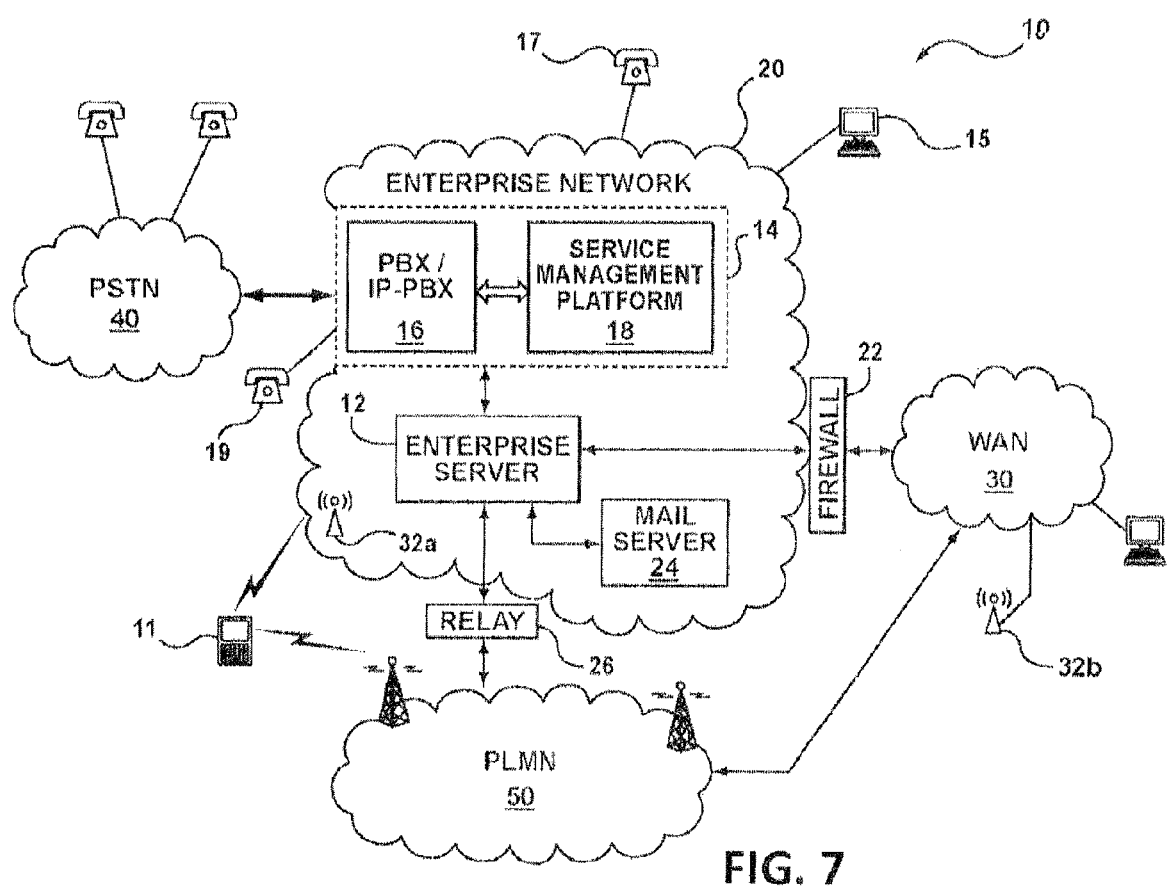
FIG. 7 shows, in block diagram form, an example system for managing enterprise-related mobile calls, including an enterprise communications platform.

Reference is now made to FIG. 7, which shows, in block diagram form, an example system, generally designated 10, for the control and management of communications. The system 10 includes an enterprise or business system 20, which in many implementations includes a local area network (LAN). In the description below, the enterprise or business system 20 may be referred to as an enterprise network 20. It will be appreciated that the enterprise network 20 may include more than one network and may be located in multiple geographic areas in some implementations.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various implementations, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some implementations. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some implementations, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch exchange (although in various implementations the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some implementations, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some implementations, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many implementations, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 8:
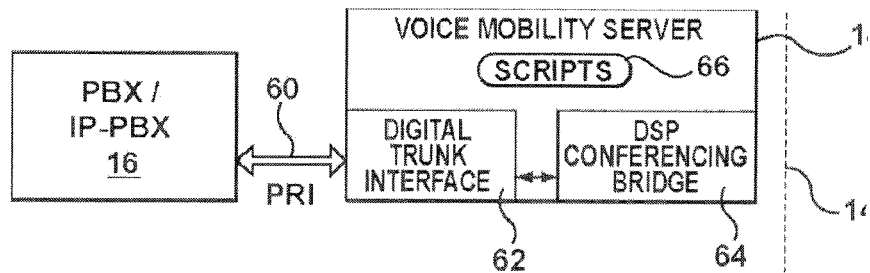
FIG. 8 shows, in block diagram form, further details of an implementation of the enterprise communications platform.
Figure 9:
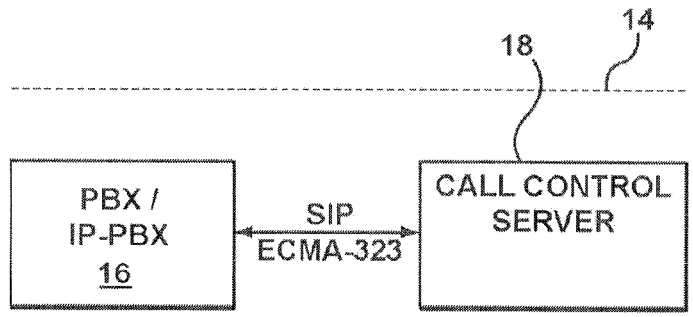
FIG. 9 shows yet another implementation of the enterprise communications platform.

Reference is now made to FIGS. 8-9 which show example implementations of the enterprise communications system 14. Again, although references are made below to "calls" or call-centric features it will be appreciated that the architectures and systems depicted and described are applicable to session-based communications in general and, in some instances, to messaging-based communications.

FIG. 8 illustrates an implementation intended for use in a circuit-switched TDM context. The PBX 16 is coupled to the SMP 18 via PRI connection 60 or other suitable digital trunk. In some implementations, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this implementation, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 9 shows another implementation in which the PBX 16 performs the functions of terminating and/or bridging media streams, but call control functions are largely handled by the SMP 18. In this implementation, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one implementation, communications between the PBX 16 and the call control server 18 are carried out in accordance with SIP. In other words, the call control server 18 uses SIP-based communications to manage the set up, tear down, and control of media handled by the PBX 16. In one example implementation, the call control server 18 may employ a communications protocol conforming to the ECMA-269 or ECMA-323 standards for Computer Supported Telecommunications Applications (CSTA).

Figure 10:
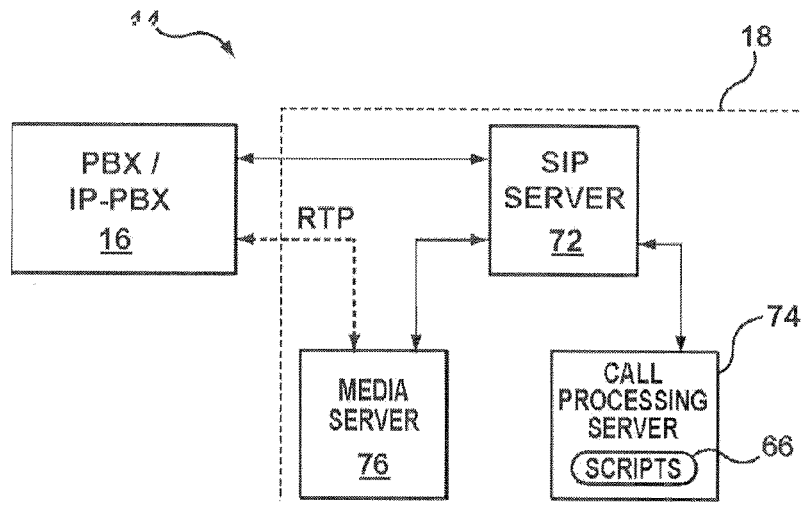
FIG. 10 shows yet another implementation of the enterprise communications platform.

FIG. 10 shows yet another implementation of the enterprise communications system 14. This implementation reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP). Other architectures or configurations for the enterprise communications system 14 will be appreciated by those ordinarily skilled in the art.

Figure 11:
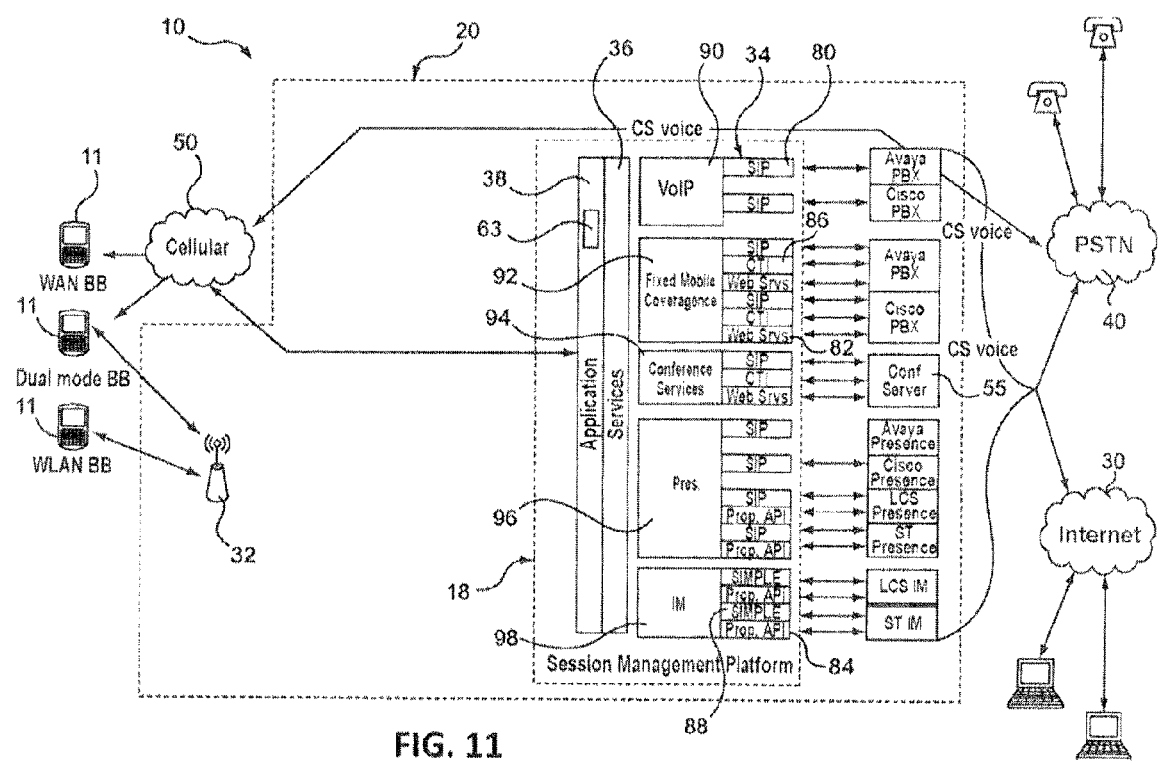
FIG. 11 shows further details of the enterprise communications platform of FIG. 9.

Reference is now made to FIG. 11, which shows another implementation of the enterprise communications system 14 with a Third Party Call Control architecture. In this implementation, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 11, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. The conference call server 55 is configured for directing media and data streams to and from one or more communication devices (i.e., mobile devices 11, telephones 17, and computers 15).

Exemplary implementations have been described hereinabove regarding a system and method for delaying teleconference access information for security. Various modifications to and departures from the disclosed implementations will occur to those having skill in the art. The subject matter that is intended to be within the spirit of this disclosure is set forth in the following claims.

What is claimed is:

1. A system for delivery of teleconference information, the system comprising:
    at least one processor,
    at least one computer readable medium in communication with the processor;
    at least one program module:
        stored on the at least one medium, and
        operative, upon execution by the processor, to:
            create a teleconference notification in response to a request from a requestor device;
            assign, to the teleconference notification, a starting date, a starting time, and an access information of a teleconference based on the request from the requestor device;
            receive an input to delay delivery of the access information;
            send the teleconference notification having the starting date and the starting time, but not the access information, to at least one participant device; and
            delay sending of the access information to the at least one participant device until a time before the starting time of the starting date of the teleconference.

2. The system of claim 1, wherein the access information comprises a telephone number and a passcode.

3. The system of claim 1, wherein the input to delay delivery of the access information is an input to delay delivery of the access information until a predetermined time period before the starting time of the starting date assigned in the teleconference notification.

4. The system of claim 1, wherein the input to delay delivery of the access information is a selection of a user-selectable option displayed on a display of the requestor device.

5. The system of claim 4, wherein the user-selectable option is one of a check-box option, a radio button, and a toggle button.

6. The system of claim 4, wherein delaying delivery is default-selected.

7. The system of claim 1, wherein the program module is further configured to store the access information on one of a server and the requestor device.

8. The system of claim 1, wherein the input to delay delivery of the access information is automatically received when the request to create a teleconference notification is detected.

9. The system of claim 1, wherein the input to delay delivery of access information is a non-overwritable selection.

10. The system of claim 1, wherein the teleconference notification is one of an email, an appointment added to an electronic calendar of the at least one participant device, and a meeting request.

11. The system of claim 1, wherein the access information is delivered in one of an email, an SMS text message, and a pop-up window displayed on a display screen of the at least one participant device.

12. The system of claim 1 wherein the program module is further operative to:
    receive an input to modify the starting date and the starting time of the teleconference; and
    adjust the delaying of sending of the access information to the at least one participant device based on a modified starting date and starting time of the teleconference.

13. A non-transitory computer program product for conference call management, the non-transitory computer program product comprising:
    a least one non-transitory computer readable medium; and
    at least one program module,
        stored on the at least one medium, and
        operable, upon execution by at least one processor to:
            create a teleconference notification based on a request from a requestor device;
            assign, to the teleconference notification, a starting date, a starting time, and an access information of a teleconference based on the request from the requestor device;
            receive an input to delay delivery of the access information;
            send the teleconference notification having the starting date and the starting time, but not the access information, to at least one participant device; and
            delay sending of the access information to the at least one participant device until a time before the starting time of the starting date of the teleconference.

14. The computer program product of claim 13, wherein sending of the access information is delayed until a predetermined time period before the starting time of the starting date assigned in the teleconference notification.

15. A computer-implemented method for secured distribution of conference call information, the method comprising:
    creating a teleconference notification based on a request detected from a requestor device;
    assigning, to the teleconference notification, a starting date, a starting time, and an access information of a teleconference based on the request from the requestor device;
    sending the teleconference notification having the starting date and the starting time, but not the access information, to at least one participant device;
    delaying sending of the access information to the at least one participant device.

16. The computer-implemented method of claim 15 wherein the access information comprises a telephone number and a passcode.

17. The computer-implemented method of claim 15 wherein the sending of the access information is delayed until a predetermined time period before the starting time of the starting date of the teleconference assigned in the teleconference notification.

18. The computer-implemented method of claim 15, wherein delaying sending of the access information is in response to a selection of a user-selectable option displayed on a display of the requestor device.

19. The computer-implemented method of claim 18, wherein delaying sending of the access information is default-selected.

20. The computer-implemented method of claim 15, wherein the access information is delivered in one of an email, an SMS text message, and a pop-up window displayed on a display screen of the at least one participant device.

* * * * *